US009286637B1

(12) United States Patent
Keld et al.

(10) Patent No.: US 9,286,637 B1
(45) Date of Patent: Mar. 15, 2016

(54) ADAPTIVE AND CUSTOMIZABLE ACCOUNT INTERFACE SYSTEM AND METHOD

(71) Applicant: JPMorgan Chase Bank, N.A., New York, NY (US)

(72) Inventors: Marcia Keld, Middletown, DE (US); Manning Field, Media, PA (US)

(73) Assignee: JP Morgan Chase Bank, N.A., New York, NY (US)

( * ) Notice: Subject to any disclaimer, the term of this patent is extended or adjusted under 35 U.S.C. 154(b) by 34 days.

(21) Appl. No.: 14/023,661

(22) Filed: Sep. 11, 2013

Related U.S. Application Data

(63) Continuation of application No. 12/388,730, filed on Feb. 19, 2009, which is a continuation-in-part of application No. 11/952,457, filed on Dec. 7, 2007, now Pat. No. 7,949,579.

(51) Int. Cl.
*G07F 19/00* (2006.01)
*G07B 17/00* (2006.01)
*G06Q 30/00* (2012.01)
*G06Q 40/02* (2012.01)
*G06Q 20/20* (2012.01)
*G06Q 20/00* (2012.01)
*G06Q 10/00* (2012.01)
*G06Q 30/02* (2012.01)

(52) U.S. Cl.
CPC .............. *G06Q 40/02* (2013.01); *G06Q 20/20* (2013.01); *G06Q 10/00* (2013.01); *G06Q 20/00* (2013.01); *G06Q 30/00* (2013.01); *G06Q 30/0201* (2013.01)

(58) Field of Classification Search
CPC ................... G06Q 20/00–20/20; G06Q 30/02; G06Q 30/0201; G06Q 10/00
USPC ........ 705/7.2, 14.51, 26.1, 21, 30, 35, 39, 40, 705/61
See application file for complete search history.

(56) References Cited

U.S. PATENT DOCUMENTS

| 4,375,032 A | 2/1983 | Uchida |
| 4,423,313 A | 12/1983 | Tanigaki |
| 4,423,318 A | 12/1983 | Gotou |
| 4,587,379 A | 5/1986 | Masuda |
| 4,594,663 A | 6/1986 | Nagata et al. |
| 4,713,761 A | 12/1987 | Sharpe et al. |
| RE32,985 E | 7/1989 | Nagata et al. |
| 4,877,947 A | 10/1989 | Mori |
| 5,220,501 A | 6/1993 | Lawlor et al. |

(Continued)

*Primary Examiner* — Olusegun Goyea
(74) *Attorney, Agent, or Firm* — Goodwin Procter LLP

(57) ABSTRACT

The invention is directed to a method and system for providing an interface including modular customizable elements for implementation by a system user. The method and system have particular application for financial accounts, such as credit card accounts. The interface may adapt in response to user behaviors. However, the user may also customize features of the interface. Thus, a behavioral monitoring and analysis system is provided for monitoring account holder spending behaviors and analyzing the spending behaviors. Account holder customization tools may be presented to the account holders through a user interface, the account holder customization tools allowing account holders to modify a user interface display of account related parameters by inputting parameters into a computing system. An experience customization engine may be implemented by a processor for receiving input from both the behavioral monitoring and analysis system and the account holder customization tools.

20 Claims, 18 Drawing Sheets

(56) References Cited

U.S. PATENT DOCUMENTS

| | | | |
|---|---|---|---|
| 5,604,802 A | 2/1997 | Holloway | |
| 5,809,483 A | 9/1998 | Broka et al. | |
| 5,903,881 A | 5/1999 | Schrader et al. | |
| 6,014,638 A * | 1/2000 | Burge | G06Q 30/02 705/27.1 |
| 6,039,245 A | 3/2000 | Symonds et al. | |
| 6,078,891 A | 6/2000 | Riordan et al. | |
| 6,334,116 B1 | 12/2001 | Ganesan et al. | |
| 6,456,981 B1 * | 9/2002 | Dejaeger | G06Q 30/02 705/14.38 |
| 6,519,572 B1 | 2/2003 | Riordan et al. | |
| 6,606,606 B2 | 8/2003 | Starr | |
| 6,609,113 B1 | 8/2003 | O'Leary et al. | |
| 6,859,212 B2 | 2/2005 | Kumar et al. | |
| 6,880,079 B2 | 4/2005 | Kefford et al. | |
| 6,959,319 B1 * | 10/2005 | Huang | G06F 17/30867 705/14.73 |
| 7,089,237 B2 * | 8/2006 | Turnbull | G06F 17/30867 |
| 7,127,679 B2 * | 10/2006 | Cohen | G06F 9/4443 715/202 |
| 7,346,548 B2 * | 3/2008 | Dweck | G06F 17/30876 705/26.1 |
| 7,409,392 B2 | 8/2008 | Greer et al. | |
| 7,437,330 B1 * | 10/2008 | Robinson | G06Q 20/04 705/67 |
| 7,496,527 B2 * | 2/2009 | Silverstein | G06Q 20/04 705/26.8 |
| 7,516,118 B1 * | 4/2009 | Badros | G06F 17/30905 |
| 7,680,708 B1 | 3/2010 | Mooney et al. | |
| 7,886,003 B2 * | 2/2011 | Newnam | H04N 7/17318 709/204 |
| 8,145,573 B2 * | 3/2012 | Hill | G06Q 20/04 705/65 |
| 2001/0029470 A1 * | 10/2001 | Schultz | G06Q 20/0453 705/26.41 |
| 2001/0029483 A1 * | 10/2001 | Schultz | G06Q 20/0453 705/39 |
| 2001/0029484 A1 * | 10/2001 | Schultz | G06Q 20/0453 705/39 |
| 2001/0032183 A1 * | 10/2001 | Landry | G06Q 20/04 705/40 |
| 2001/0044762 A1 * | 11/2001 | Nault | G06Q 40/02 705/30 |
| 2002/0007330 A1 * | 1/2002 | Kumar | G06F 9/547 705/36 R |
| 2002/0077966 A1 * | 6/2002 | Harycki | G06Q 40/00 705/38 |
| 2002/0089532 A1 * | 7/2002 | Cohen | G06F 17/3089 715/736 |
| 2002/0099648 A1 * | 7/2002 | DeVoe | G06Q 20/04 705/38 |
| 2002/0103789 A1 * | 8/2002 | Turnbull | G06F 17/30867 |
| 2002/0154157 A1 * | 10/2002 | Sherr | G06F 21/10 715/716 |
| 2002/0188559 A1 * | 12/2002 | Schultz | G06Q 20/0453 705/39 |
| 2003/0004983 A1 * | 1/2003 | Cohen | G06F 9/4443 715/205 |
| 2003/0023492 A1 | 1/2003 | Riordan et al. | |
| 2003/0023594 A1 | 1/2003 | Ramamurthi | |
| 2003/0088460 A1 | 5/2003 | Riordan et al. | |
| 2003/0191711 A1 * | 10/2003 | Jamison | G06Q 20/04 705/40 |
| 2003/0200173 A1 * | 10/2003 | Chang | G06Q 20/102 705/40 |
| 2004/0015366 A1 * | 1/2004 | Wiseman | G06Q 10/06 705/1.1 |
| 2004/0019553 A1 | 1/2004 | Setz et al. | |
| 2004/0080527 A1 | 4/2004 | Elliott | |
| 2004/0088355 A1 * | 5/2004 | Hagan | G06F 21/6254 709/203 |
| 2004/0093281 A1 * | 5/2004 | Silverstein | G06Q 20/04 705/26.8 |
| 2004/0117361 A1 | 6/2004 | Greer et al. | |
| 2004/0128388 A1 * | 7/2004 | Kaiser | G06F 17/30943 709/227 |
| 2004/0205586 A1 * | 10/2004 | Cohen | G06F 17/3089 709/224 |
| 2004/0236647 A1 | 11/2004 | Acharya | |
| 2005/0131792 A1 | 6/2005 | Rowe | |
| 2005/0171881 A1 | 8/2005 | Ghassemieh et al. | |
| 2005/0246234 A1 * | 11/2005 | Munyon | G06Q 30/04 705/21 |
| 2005/0273722 A1 * | 12/2005 | Robb | G06Q 30/00 715/764 |
| 2006/0089877 A1 * | 4/2006 | Graziano | G06Q 20/14 705/14.17 |
| 2006/0259390 A1 * | 11/2006 | Rosenberger | G06Q 20/04 705/35 |
| 2007/0035523 A1 * | 2/2007 | Cohen | G06F 9/4443 345/169 |
| 2007/0073562 A1 | 3/2007 | Brice et al. | |
| 2007/0084913 A1 * | 4/2007 | Weston | G06Q 20/20 235/380 |
| 2007/0100704 A1 * | 5/2007 | Liu | G06Q 30/0201 705/7.29 |
| 2007/0100773 A1 * | 5/2007 | Wallach | G06Q 20/382 705/75 |
| 2007/0156392 A1 | 7/2007 | Balchandran et al. | |
| 2007/0260729 A1 * | 11/2007 | Dweck | G06F 17/30876 709/224 |
| 2008/0127231 A1 * | 5/2008 | Shaffer | G06Q 10/109 719/328 |
| 2008/0215560 A1 * | 9/2008 | Bell | G06F 17/30991 |
| 2008/0245854 A1 | 10/2008 | Monden | |
| 2008/0275779 A1 * | 11/2008 | Lakshminarayanan | G06Q 20/02 705/39 |
| 2008/0301153 A1 | 12/2008 | Greer et al. | |
| 2008/0301732 A1 * | 12/2008 | Archer | H04N 7/17318 725/40 |
| 2009/0081989 A1 * | 3/2009 | Wuhrer | G06Q 20/10 455/406 |
| 2009/0106158 A1 * | 4/2009 | Hill | G06Q 20/04 705/66 |
| 2009/0127329 A1 * | 5/2009 | Barret | G06Q 20/02 235/380 |
| 2009/0199094 A1 * | 8/2009 | Jurgens | G06Q 20/02 715/700 |
| 2009/0287604 A1 * | 11/2009 | Korgav | G06Q 20/04 705/40 |
| 2009/0292591 A1 * | 11/2009 | Schultz | G06Q 20/0453 705/39 |
| 2009/0319929 A1 * | 12/2009 | Wang | G06F 9/4443 715/765 |
| 2010/0036946 A1 * | 2/2010 | von Arx | G06F 17/30876 709/225 |
| 2010/0057574 A1 * | 3/2010 | Banerjee | G06Q 10/10 705/35 |
| 2010/0083217 A1 * | 4/2010 | Dalal | G06F 17/30867 717/106 |
| 2010/0094774 A1 * | 4/2010 | Jackowitz | G06Q 40/06 705/36 R |
| 2010/0100424 A1 * | 4/2010 | Buchanan | G06Q 20/10 705/35 |
| 2010/0100469 A1 * | 4/2010 | Buchanan | G06Q 10/06 705/35 |
| 2010/0100470 A1 * | 4/2010 | Buchanan | G06Q 10/10 705/35 |
| 2010/0114763 A1 * | 5/2010 | Rosenberger | G06Q 20/10 705/40 |
| 2010/0174606 A1 * | 7/2010 | Hoyle | G06F 8/60 705/14.52 |
| 2010/0325043 A1 * | 12/2010 | Buchanan | G06Q 20/105 705/41 |

(56) References Cited

U.S. PATENT DOCUMENTS

| | | | |
|---|---|---|---|
| 2011/0087985 A1* | 4/2011 | Buchanan | G06F 3/04847 715/771 |
| 2011/0107265 A1* | 5/2011 | Buchanan | G06Q 30/02 715/835 |
| 2011/0179078 A1* | 7/2011 | Boerries | G06F 17/30864 707/770 |
| 2012/0005082 A1* | 1/2012 | Pitroda | G06Q 20/02 705/39 |
| 2012/0057686 A1* | 3/2012 | Bingaman | G06Q 30/04 379/114.03 |

* cited by examiner

| Preferences |
|---|
| General |
| Permissions |
| Payment |

Statement period ▼ — 702

Duration

Pay cycle ▼ — 706

Every

| 14 | Days ▼ | — 710 |

Beginning

| August ▼ | 2 ▼ | 2013 ▼ | — 712 |

◀       AUGUST       ▶

| S | M | T | W | T | F | S |
|---|---|---|---|---|---|---|
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

— 720

| Out-of-office settings |
|---|
| Data |
| Tools |

Fraud guardian

| Amount 802 | Point of sale 810 | Location | Categories | Merchant |
|---|---|---|---|---|
| ≥ $500 | Any | Any 820 | Any 830 | Any 840 |
| ≥ $50 | Keyed | In-state | Auto | Any |
| ≥ $75 | Online | Out-of-state | Beauty | eBay |
| ≥ $100 | Retail | International | Clothing | PayPal |
| ≥ $150 | | | Education | |
| ≥ $200 | | | Electronics | |
| ≥ $250 | | | Entertainment | |
| ≥ $300 | | | Fees | |
| ≥ $400 | | | Finance | |
| ≥ $500 | | | Food + Dining | |

Create rule
860

800

Never allow ▼

Amount ≥ $500
POS Any
Location Out-of-state     850
Category Any
Merchant Any

FIG. 8

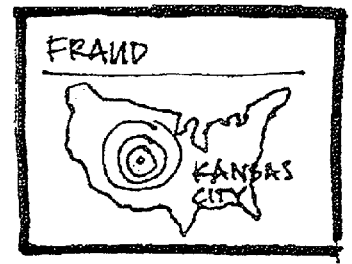
00:03  FIG 10A
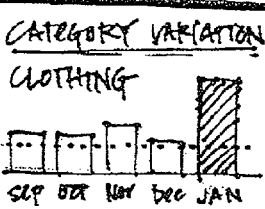
00:28  FIG 10B
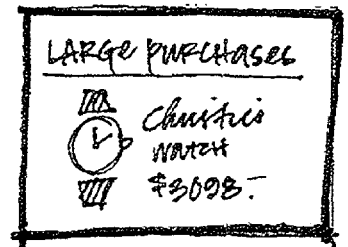
00:16  FIG 10C
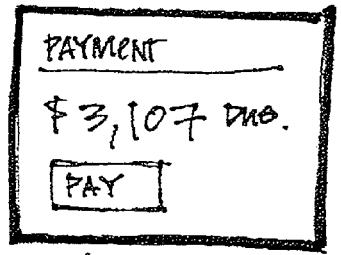
00:42  FIG 10D Out of office settings ▼ ~110

◀ November ▶ ~112

| S | M | T | W | T | F | S |
|---|---|---|---|---|---|---|
|   |   |   |   |   | 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 24 |
| 25 | 26 | 27 | 28 | 29 | 30 | 31 |

11/01/13 - 11/23/13 ~114

Australia ▼ ~115

Sydney ▼ ~116 meredith@play.com ~117

Phone ~118

Save settings ~119

FIG. 11

| Preferences | ~ 120 |

| General |

| Online ▼ | ~ 121 |

Management  ~ 122
|—|—|—|—|
Hands-off      Hands-on

Education  ~ 123
|—|—|—|—|
Self-sufficient   Seeking advice

Spending  ~ 124
|—|—|—|—|
Varied           Consistent

Information  ~ 125
|—|—|—|—|
Detailed         Big picture

Presentation  ~ 126
|—|—|—|—|
Numeric              Visual

| Permissions | ~ 127 |
| Payment | ~ 128 |
| Out-of-office settings | ~ 129 |
| Data |
| Tools |

FIG. 12

ADAPTIVE AND CUSTOMIZABLE ACCOUNT INTERFACE SYSTEM AND METHOD

CONTINUING DATA

This patent application is of a continuation of U.S. patent application Ser. No. 12/388,730, filed Feb. 19, 2009, which is a continuation in part of U.S. patent application Ser. No. 11/952,457 filed Dec. 7, 2007 (now U.S. Pat. No. 7,919,579), all of which are hereby incorporated in their entirety.

TECHNICAL FIELD

Embodiments of the invention are related generally to systems and methods for improving a customer experience and in particular to improving customer accessibility to financial account information.

BACKGROUND OF THE INVENTION

In recent years, consumers have drastically reduced the use of cash payment for goods and services and have more frequently relied on credit cards, debit cards, stored value cards, or electronic transfer of funds associated with a financial account to facilitate financial transactions. Due to the electronic nature of payment, financial institutions are able to track consumer behaviors involved in these transactions.

Traditionally, financial institutions have administered customer accounts in a systematic manner, in some instances without regard for account holder preferences, and in other instances based on account holder preferences expressed upon initiation of an account. For example, billing cycles are predetermined and statements are sent either through the mail or electronically. Electronic transmissions may include an email message with an embedded link to a statement.

Financial institutions frequently provide multiple types of products, such as credit cards, debit cards, mortgages, brokerage accounts, and other types of accounts and may offer a number of different options related to the management of each account. Typically, account holders are informed of these options upon opening an account or through special offers that may be made periodically.

Given the increased availability of electronic resources, such as financial institution web sites that are available to account holders over the Internet, it is now possible to provide account holders with a real time display of account activity as well as available account options. Although financial institutions have increased the availability of resources to account holders, these resources remain uniform without regard for individual account holder behaviors and preferences.

Accordingly, a solution is needed that leverages data available to financial institutions for each account holder in order to provide valuable up-to-date information to each account holder in an efficient manner. Furthermore, a solution is needed that leverages the data to provide differential data to each account holder dependent upon account holder preferences.

SUMMARY OF THE INVENTION

In one aspect of the invention, a computer-implemented account interface system is provided and is operated in cooperation with a financial institution on behalf of multiple account holders. The account interface system comprises a behavioral monitoring and analysis system for monitoring account holder spending behaviors and analyzing these spending behaviors and account holder customization tools presented to the account holders through a user interface, the account holder customization tools allowing account holders to modify a user interface display of account related parameters by inputting selections into a computing system. The account interface system additionally includes an experience customization engine implemented by a processor for receiving input from both the behavioral monitoring and analysis system and the account holder customization tools in order to formulate the user interface display of related account parameters and user interface presentation components for presenting the account holder with a user interface display of account parameters and the account holder customization tools for allowing the account holders to modify the presented user interface display.

In an additional aspect of the invention, a computer-implemented method is provided for formulating an adaptive and customizable account interface for multiple account holders. The method comprises monitoring account holder spending behaviors and analyzing the spending behaviors in accordance with predetermined rules. The method further includes receiving input from account holder customization tools presented through an account holder interface, the account holder customization tools for allowing account holders to alter the account holder interface by implementing selectable options. The method further includes analyzing the account holder spending behaviors and selectable options input by the account holder through the use of an experience customization engine implemented by a processor in order to formulate a customized user interface display of account related parameters. The method also includes presenting the account holder with the user interface display through a computing device accessible to the account holder and allowing the account holder to further customize the user interface display through provision of account holder customization tools providing the selectable options.

In an additional aspect of the invention, a computer-implemented experience customization system is provided for customizing a financial account holder experience based on financial account holder preferences and financial account holder behaviors. The experience customization system comprises an account billing cycle modification module implemented by a processor for accepting input from the financial account holder for determining billing cycle parameters and for setting the account holder billing cycle based on the input parameters. The experience customization system further comprises a preference selection module for receiving input from the financial account holder to determine a configuration of the financial account holder interface and adaptive formatting components for modifying a financial account holder interface based upon an analysis of account holder behaviors. The preference selection module and the adaptive formatting components convey the determined configuration for display to user interface presentation components for display to the financial account holder.

BRIEF DESCRIPTION OF THE DRAWINGS

The present invention is described in detail below with reference to the attached drawings figures, wherein:

FIG. 7 illustrates a user interface for customizing a payment cycle in accordance with an embodiment of the invention;

FIG. 8 illustrates a user interface for personalizing and controlling triggers for fraud protection in accordance with an embodiment of the invention;

FIGS. 10A-D are user interfaces for providing a rapid step-by-step account view in accordance with an embodiment of the invention;

FIG. 11 is a user interface illustrating out-of-office settings in accordance with an embodiment of the invention;

FIG. 12 is a user interface illustrating preference sliders in accordance with an embodiment of the invention;

DETAILED DESCRIPTION OF PREFERRED EMBODIMENTS

Embodiments of the present invention are directed to a method and system for providing an interface including modular customizable elements for implementation by a system user. The method and system have particular application for financial accounts, such as credit card accounts. The interface may adapt in response to user behaviors. However, the user may also customize features of the interface.

Figure 1:
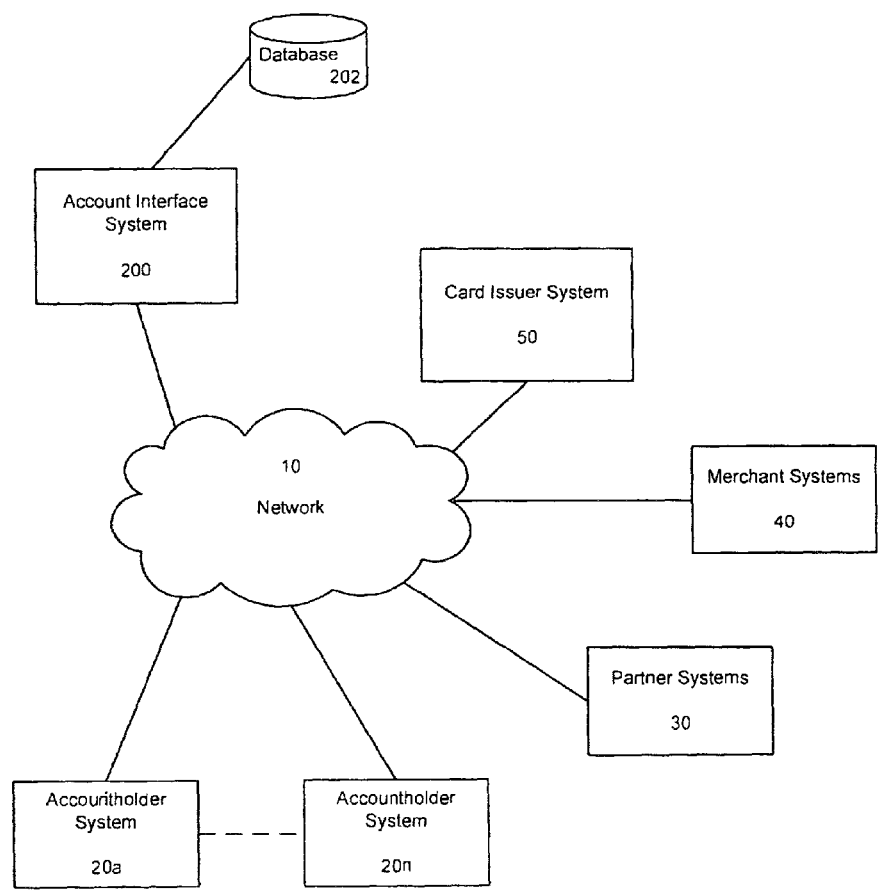
FIG. 1 is a block diagram illustrating an operating environment for an account interface system in accordance with an embodiment of the invention.

FIG. 1 is a block diagram illustrating an operating environment 100 for an account interface system 200 in accordance with an embodiment of the invention. As illustrated, the account interface system 200 may access a database 202 and may store data in and retrieve data from the database 202. In embodiments of the invention, the account is associated with a card, such as a credit card, a debit card, a stored value card, or other type of card. A card issuer or financial institution system 50 may also be connected with the account interface system 200 over the network 10.

Account holder systems 20a . . . 20n may be connected over a network 10 with the account interface system 200. Additionally, merchants 40 and card issuer partners 30 may be connected with one another over the network 10.

Although illustrated as separate systems, in embodiments of the invention, the account interface system 200 and the card issuer or financial institution system 50 may be integrated so as to form a unitary system.

The network 10 may for example include the Internet. Although the various systems are shown as connected over one network, they may instead be connected over multiple networks.

The card issuer system 50 is typically maintained by a financial institution and provides the account holder systems 20a . . . 20n with account information when requested. In the illustrated environment, the card issuer system 50 may cooperate with the account interface system 200 in order to provide the account information. The card issuer system 50 typically also provides monthly or other periodic statements to the account holder systems 20a . . . 20n and provides payment information to merchants 40. The card issuer system 50 may further share purchase information and other relevant information with partner systems 40.

Merchant systems 40 may include online shopping systems accessible via the network 10 or another network. The merchant systems may further be connected to POS devices in retail environments. In the illustrated environment, the account interface system 200 is capable of collecting information from and distributing information to partner systems 30 and merchant systems 40.

All of the aforementioned systems are computing systems with processing components and are connected over the network. The computing systems may be any of the known types of computing systems as will be further described below.

Figure 2:
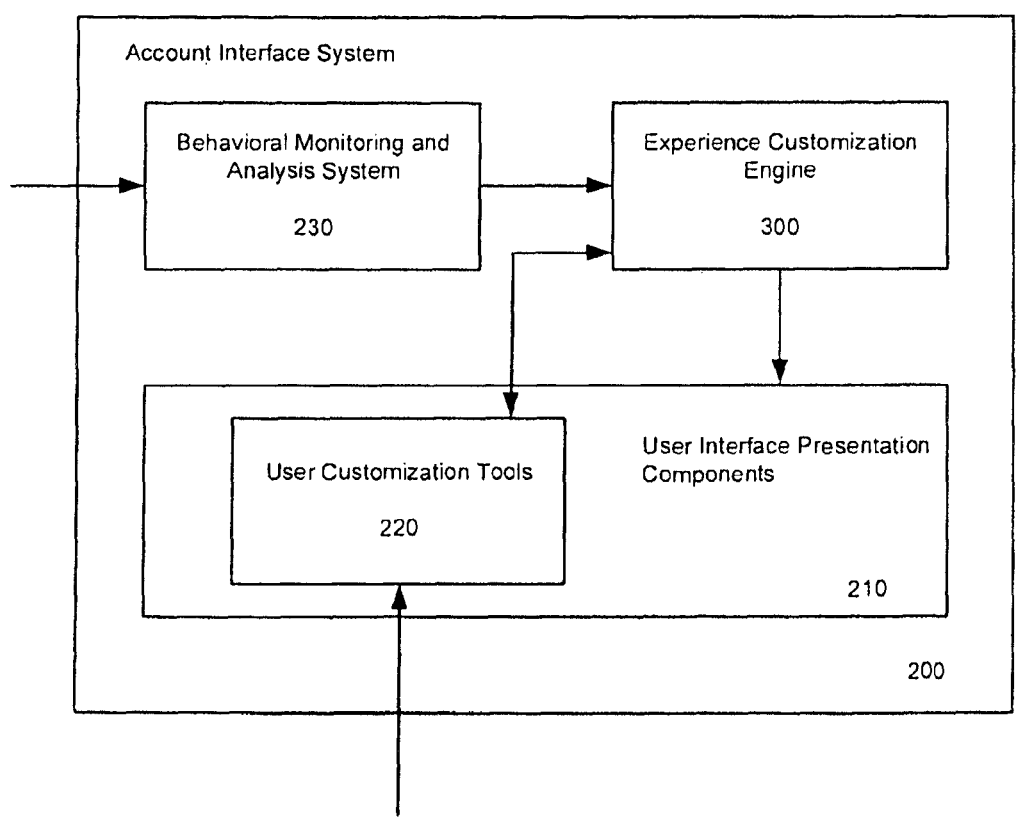
FIG. 2 is a block diagram illustrating an account interface system accordance with an embodiment of the invention.

FIG. 2 is a block diagram illustrating an account interface system 200 in accordance with an embodiment of the invention. The account interface system 200 may include a behavioral monitoring and analysis system 230, user interface presentation components 210, user customization tools 220, and an experience customization engine 300.

As illustrated by the arrows in FIG. 2, both the user customization tools 220 and the behavioral monitoring and analysis system 230 receive external input. The user customization tools 220 are configured to receive input from account holder systems in order to allow account holders to select display preferences. The behavioral monitoring and analysis system 230 may receive input from merchants and partners and may also monitor account holder behaviors.

Based on input from the behavioral monitoring and analysis system 230 and the user customization tools 220, the experience customization engine 300 may complete an analysis and may then instruct the system to alter the presentation of the user interface presentation components 210.

Figure 3:
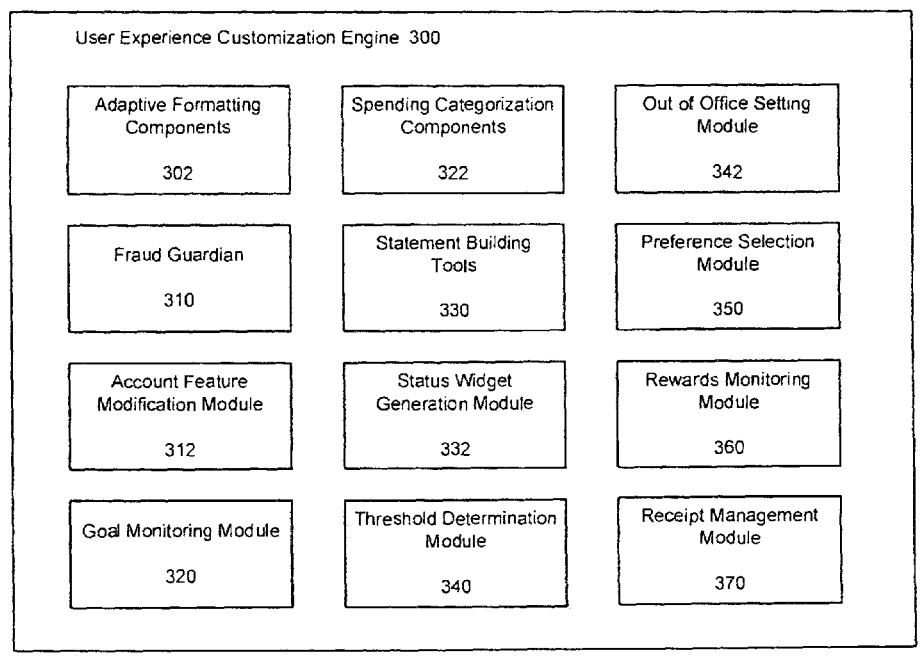
FIG. 3 is a block diagram illustrating a user experience customization engine of an account interface system in accordance with an embodiment of the invention.

FIG. 3 is a block diagram illustrating the user experience customization engine 300 in accordance with an embodiment of the invention. The user experience customization engine 300 may include adaptive formatting components 302, a fraud guardian 310, an account feature modification module 312, and a goal monitoring module 320. The user experience customization engine 300 may additionally include spending categorization components 322, statement building tools 330, a status widget generation module 332, and a threshold determination module 340. The user experience customization engine 300 may also include an out of office setting module 342, a preference selection module 350, a rewards monitoring module 360, and a receipt management module 370.

Although the aforementioned components are shown as discrete modules, each of the modules may alternatively be integrated with one another. If the modules are discrete, multiple modules may operate cooperatively as will be further explained below.

Each of the components of the user experience customization engine 300 may be implemented to customize the account holder experience by altering the user interface through the user interface presentation components 210.

Additionally, the components may cooperate with one another to provide information to the card issuer system and to the user interface presentation components of FIG. 2. For example, the fraud guardian 310, the threshold determination module 340, the out of office setting module 342, and the status widget generation module may function cooperatively to detect, convey, and analyze instances of suspected fraudulent behavior. Furthermore, the receipt management module 370 and the spending categorization components 322 may operate cooperatively to analyze and convey information about account holder spending. The preference selection module 350, statement building tools 330, and adaptive formatting components 302 may operate cooperatively to formulate presentation of account information to the account holders.

The functionality of each of the components of the user experience customization engine 300 will be further described below in connection with the associated user interfaces shown in FIGS. 8-18.

The components shown in FIGS. 1-3 above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

Figure 4:
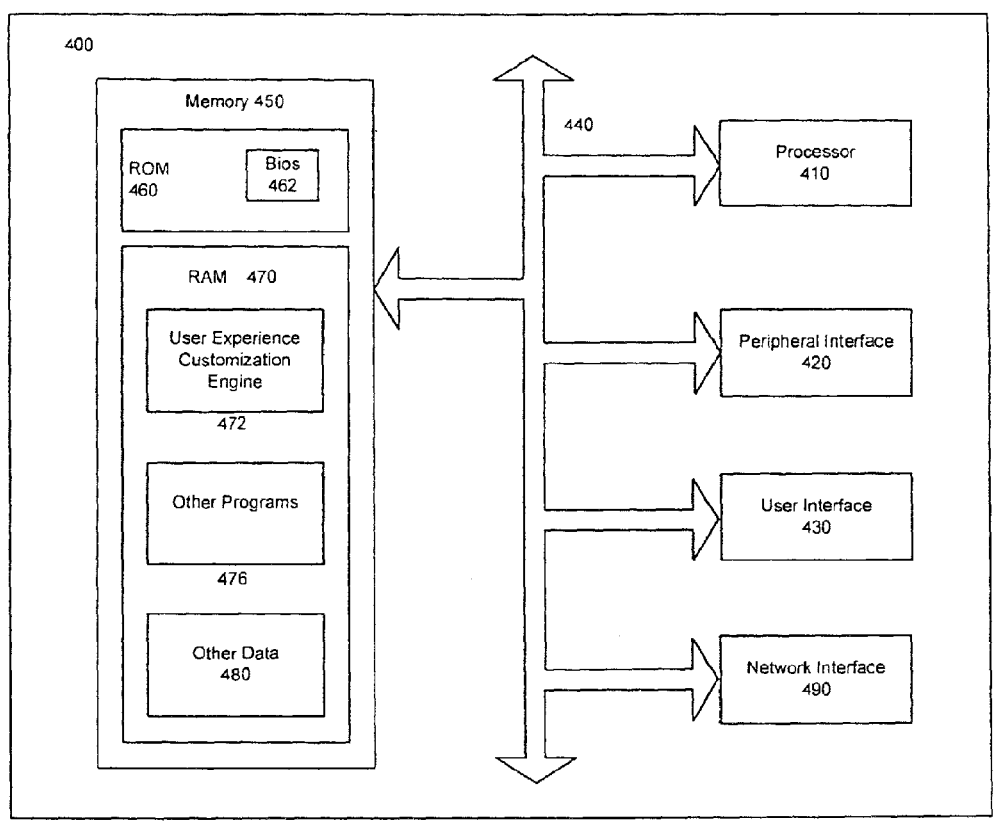
FIG. 4 is a block diagram illustrating a computing system implementing a user experience customization engine in accordance with an embodiment of the invention.

FIG. 4 illustrates an exemplary computer configuration 400 in accordance with embodiments of the invention. This configuration is merely exemplary and should not be construed as limiting.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system 400 may include a general purpose computing device in the form of a computer including a processing unit 410, a system memory 450, and a system bus 440 that couples various system components including the system memory 450 to the processing unit 410.

Computers typically include a variety of computer readable media that can form part of the system memory and be read by the processing unit. By way of example, and not limitation, computer readable media may comprise computer storage media and communication media. The system memory 450 may include computer storage media in the form of volatile and/or nonvolatile memory such as read only memory (ROM) 460 and random access memory (RAM) 470. A basic input/output system (BIOS) 462, containing the basic routines that help to transfer information between elements, such as during start-up, is typically stored in ROM 460. RAM 470 typically contains data and/or program modules that are immediately accessible to and/or presently being operated on by processing unit. The data or program modules may include the illustrated user experience customization engine 472, an operating system, application programs, other program modules 476, and program data 480. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 450 includes at least one set of instructions that is either permanently or temporarily stored. The processor 410 executes the instructions that are stored in order to process data. The set of instructions may include various instructions that perform a particular task or tasks, such as those shown in the appended flowchart of FIG. 5. Such a set of instructions for performing a particular task may be characterized as a program, software program, software, engine, module, component, mechanism, or tool. The account interface system 200, as shown in FIG. 2, may include a plurality of software processing modules stored in a memory as described above and executed on one or more processors in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 410 that executes commands and instructions may be or be located within a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 430 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit 410 through a user input interface that is coupled to the system bus 440, but may be connected by other interface and bus structures, such as a parallel poll, game port or a universal serial bus (USB).

One or more monitors or display devices may also be connected to the system bus via an interface 420. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter 490. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include BluetoOth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 5:
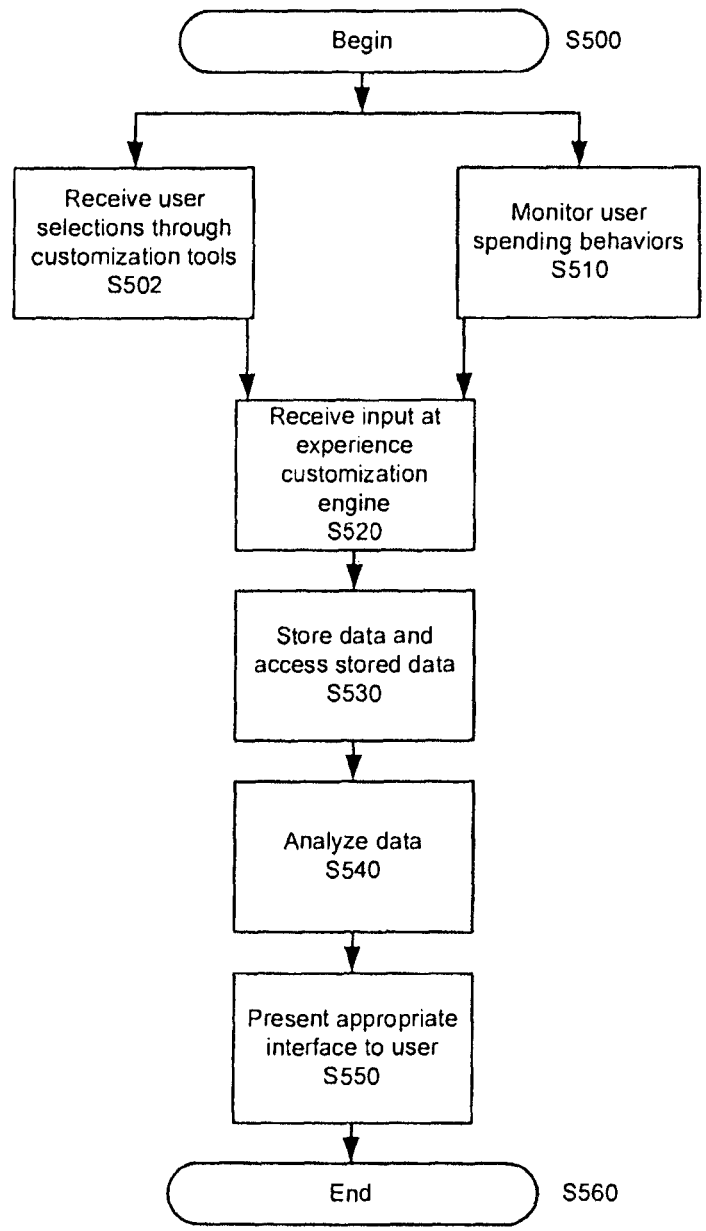
FIG. 5 is a flow chart illustrating a method for customizing a user experience in accordance with an embodiment of the invention.

FIG. 5 is a flow chart illustrating a method for customizing a user experience in accordance with an embodiment of the invention. The method begins in S500 and the account interface system receives user selections through customization tools in S502 and monitors user behaviors in S510. The information gathered in S502 and S510 is received at the experience customization engine in S520. In S530, the experience customization engine may interact with the database to store collected data and access stored data. In S540, the experience customization engine may analyze the data and determine appropriate features for display. In S550, the experience customization engine may send its results to the user interface presentation components so that the user interface presentation components may present the appropriate components for display to each account holder including the user customization tools for allowing further customization.

FIGS. 6-18 illustrate the various types of features that the components of the experience customization engine 300 of FIG. 3 may formulate. As set forth above, based on account holder input and monitored behaviors, the experience customization engine directs the user interface presentation components to shape the account holder experience.

Figure 6:
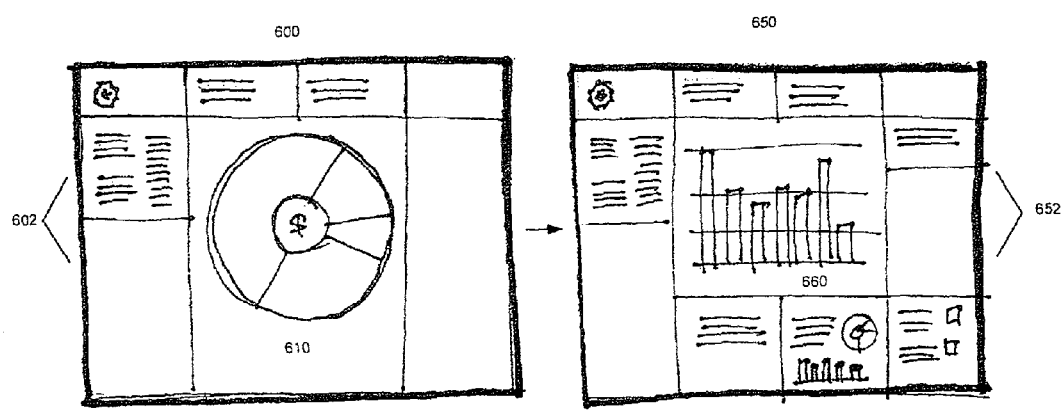
FIG. 6 illustrates a user interface customized for a user in accordance with an embodiment of the invention.

FIG. 6 illustrates an adaptive and modular user interface 600 that can customized by the adaptive formatting components 302 included in the experience customization engine 300 of FIG. 3 to arrive at a second user interface 650. When an account holder visits a financial institution web page and logs in to the financial institution system in order to view account information, the account holder may be presented with the user interface 600. The user interface 600 may include multiple modules 602 including a central display module 610.

In one embodiment of the invention, upon viewing the user interface 600, the account holder may choose to alter the default display by implementing user customization tools 220 described above with reference to FIG. 2. In an alternative embodiment of the invention, the financial institution may implement the behavior monitoring and analysis system 230 to analyze account holder actions during repeated visits to the financial institution web site. This analysis, is subsequently used to select modules and adapt formatting of the user interface 650.

In either case, the user experience customization engine 300 may implement the adaptive formatting components 302 in order to transform the default user interface 600 to the default user interface 650. As illustrated in FIG. 6, the central display 660 has been altered to display a bar graph. Additionally, the presentation and content of the peripheral modules 652 may be altered and customized.

Thus, the adaptive interface 600 is composed of modular elements. In embodiments of the invention, the behavior monitoring and analysis system 230 learns user behavior adapts contents of the interface accordingly. In additional embodiments of the invention, the user customization tools 220 provide information for adaptation. In yet further embodiments of the invention, these two sources of information may be combined to adapt the interface 600.

The adaptive modular interface 600 provides timely and appropriate information to users allowing them to make decisions rapidly and have an effortless experience. The adaptive modular interlace saves user time and gives users confidence. For the financial institution, the system gains an understanding of what users want over time in order to increase operational efficiency. The system also detects changes in account holder circumstances and gives the financial institution the tools to respond with new offerings.

FIG. 7 illustrates user interface 700 for changing account features in cooperation with the account feature modification module 312 of the experience customization engine 300 of FIG. 3. In particular, the user interface 700 allows for customizing a billing cycle in accordance with an embodiment of the invention. Allowing an account holder to customize a billing cycle to align with the account holder's direct deposit or payment cycle would often be beneficial to both the account holder and the financial institution as it will increase the likelihood that payments will clear smoothly.

Thus, the user customization tools 220 of FIG. 2 preferably provide the user interface 700 to allow account holders to align their statement cycle with their individual pay cycles or other critical dates. In embodiments of the invention, drop down menus 702, 706, 710, and 712 may be provided that allow account holders to select from a plurality of options. In a general preferences section, an account holder may select a statement period 702. For a duration, the account holder may select a pay cycle as shown at 706. Selectable option 710 may allow an account holder to select a number of hours, days, months, or other time period. The account holder may select a date to begin at selection area 712 and may reference calendar 720 when making selections.

Thus, through the billing cycle user interface 700, account holder may select a ten day billing cycle, a ninety day billing cycle, or a bi-weekly billing cycle, etc. This feature maximizes account holder flexibility and entails changes to core operations of the Financial institution.

Thus, the billing cycle user interface 700 and associated account feature modification module 312 are useful for adapting payments to an account holder's timing. For the financial institution, this features helps determine what statement periods are meaningful to customers and enables the financial institution to provide duration-specific offers and obtain more rapid payback.

FIG. 8 illustrates a fraud protection user interface 800 for personalizing and controlling triggers for fraud protection in accordance with an embodiment of the invention. The fraud protection user interface 800 may be formulated by the fraud guardian 310 of the experience customization engine 300 shown in FIG. 3.

The fraud guardian interface 80Q may include multiple selectable user options, such as an amount 802, a point of sale 810, a geographic location 820, categories 830, and a merchant 840 Through these selectable options, the account holder may choose to prohibit specific combinations of features in order to protect his or her account from fraudulent use. For example, in the displayed embodiment, the scenario 850 shows that the account holder never wants to allow amounts of $500 or greater to be charged from a FOS terminal for any category or merchant at an out of state location. A rule creation button 860 allows creation of multiple prohibited or restricted scenarios that may be monitored by the fraud guardian 310. For example, a user may want to prohibit all international transactions or prohibit any purchases through online auctions. Thus, the fraud guardian 310 may also communicate with the card issuer system in order to provide notification of transactions that should be disallowed.

Typically, financial institutions have their own fraud prevention policies in place. The disclosed fraud protection interface 800 provides supplemental fraud protection by allowing an account holder to select prohibited scenarios. As illustrated in FIG. 2, the behavioral monitoring and analysis components 230 feed information pertaining to account activity to the experience customization engine 300 and the user customizations tools 220 feed fraud restrictions to the experience customization engine 300. Accordingly, the fraud guardian 310 of the user experience customization engine 300 detects discrepancies and can instruct the user interface presentation components 210 to display these discrepancies to the account holder and further may be enabled to block account access or notify the card issuer system to block account access or disallow a transaction based on the restrictions maintained by the account holder.

Thus, the fraud guardian interface 800 as provided by the fraud guardian components 310 of the user experience customization engine 300 includes a user specified set of conditions under which transactions should be disallowed. Thus, account holders have personal control over fraud notifications and policies. The fraud guardian components 310 offer a sense of control and confidence to account holders by giving them the ability to prevent unnecessary application of fraud policies. The fraud guardian components 310 add another layer of security to existing fraud components in order to reduce incidence of erroneous charges.

Figure 9:
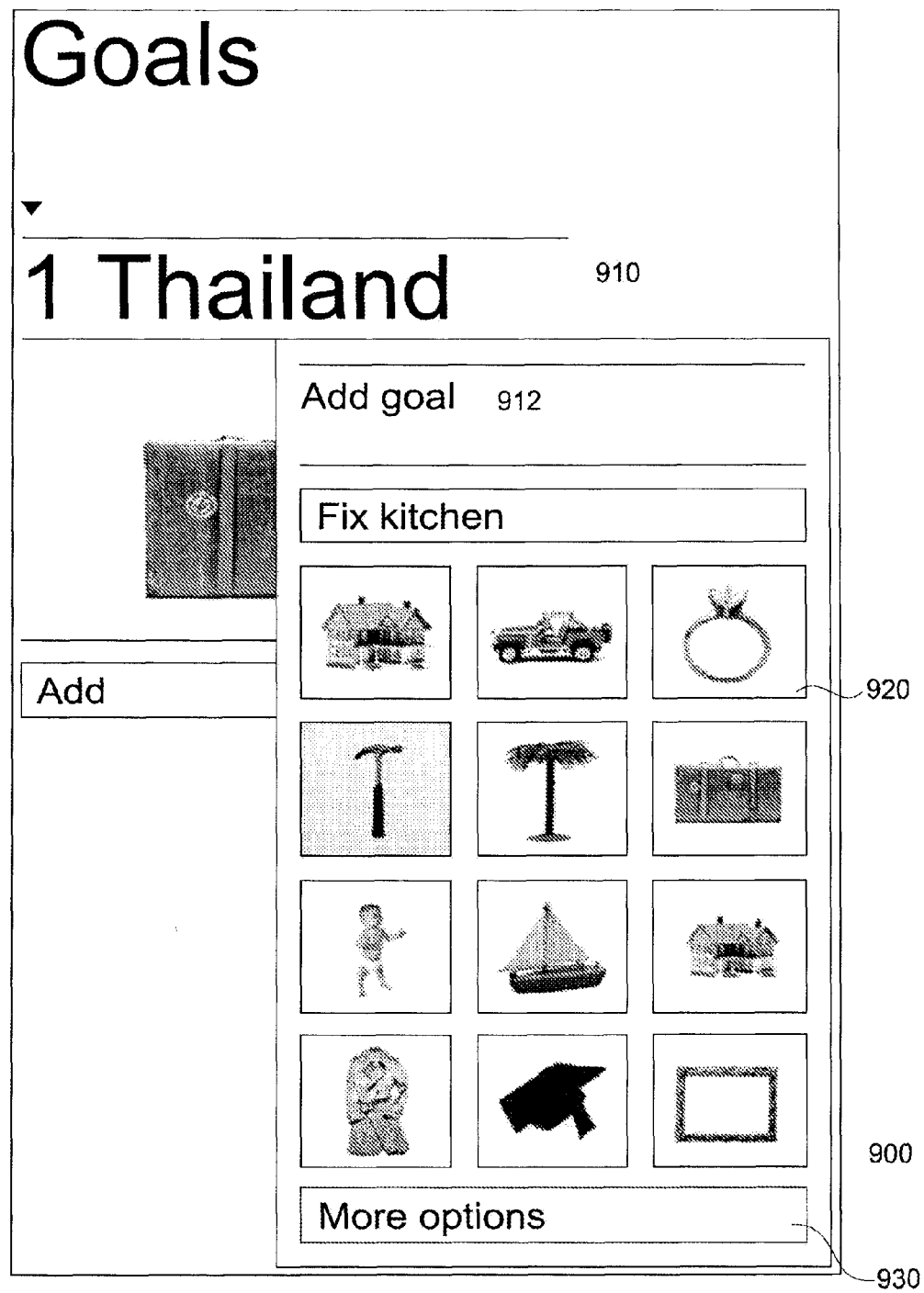
FIG. 9 illustrates a financial goals interface in accordance with an embodiment of the invention.

FIG. 9 illustrates a financial goals interface 900 in accordance with an embodiment of the invention. The financial goals interface 900 may allow account holder prioritization of goals. Goals may be prioritized as indicated by the selection of Thailand as goal number one at 910. Additional goals may be selected through goal addition functionality 912. Multiple thumbnail options 920 may be provided to illustrate goals. Additional options 930 may be displayed upon user selection.

Furthermore, by monitoring stored data related to user behavior, the account interlace system is able to compare stored data with the user-selected goals in order to inform an account holder when the goals have been reached. The goal interface 900 may be formulated in response to user input and monitored user behavior by the goal monitoring module 320 of the user experience customization engine 300

The goal interface 900 benefits account holders by providing system includes a visible and sortable list of personal financial goals. Account holders can manage and prioritize the list. The goal interface provides a tool for marking progress and for determining how behavior impacts goals. The financial institution may provide tailored offerings and advice to help users achieve their goals. Account holder manipulation of the goal interface 900 tells the financial institution what customers care about and provides a place for the financial institution to present tailored advice and offerings to help cardholders meet their goals.

FIGS. 10A-D are simplified statement view user interfaces 100 for providing a rapid step-by-step account views in accordance with an embodiment of the invention. The statement views may be produced by the statement building tools 330 of the user experience customization engine 300.

Each of views 102, 104, 106, and 108 illustrates a transaction characteristic or a payment due and includes a time code on a bottom left corner. For example, the account view 102 may indicate that an uncharacteristic transaction has been requested from a certain location, which in this case is Kansas City. This uncharacteristic transaction may be outside of user pre-set parameters, such as through the fraud guardian disclosed above, or may alternatively be detected by the financial institution as contrary to previous account holder behavior. Thus, the view 102 may be provided to alert the account older to this irregularity.

Statement view 104 illustrates a category variation that may be detected by the financial institution as irregular and/or as exceeding thresholds pre-set by the user. In the illustrated example, the category variation shows that in the month of January, an unusual volume of clothing expenses was accumulated.

Statement view 106 illustrates an unusually large purchase for $3098 that may be detected by the financial institution to be uncharacteristic or may violate an account holders pre-selected fraud settings or threshold settings.

Finally, statement view 108 indicates a payment due and may be provided in this simplistic format to give the account holder notification of the payment due. As set forth above, the due date may be selected in accordance with the account holders payment cycle preferences.

Thus, the statement view provides a short step-by step accounting of the key elements of the statement experience including payment information, variances, and meaningful purchases. Account holders can customize elements for review and the order in which these elements are reviewed. Mobile, online, and print channels could each offer different experiences.

The statement view provides a simpler experience for account holders that allows passive review and invites active analysis. The financial institution has an enhanced ability to move customers away from paper or to simpler paper statements. Furthermore, the simple statement view can function as a customer service tool for representatives.

FIG. 11 is a user interface illustrating out-of-office settings 110 in accordance with an embodiment of the invention. The out of office interface 110 may be determined by the out of office setting module 342 of the user experience customization engine 300.

A calendar 112 with selectable dates may be provided to assist with selection of a date range 114. A location including country 115 and city 116 may be selected. Contact information may be provided during the out-of office period including email address 117 and phone number 118. The settings may be saved at 119.

In embodiments of the invention, the out-of-office interface 110 may automatically be presented to a user upon occurrence of certain events. For example, if the user books a motel, purchases airline tickets, or has earned a rewards trip, the out-of-office settings may be offered. Thus, the behavior monitoring and analysis components may alert the user experience customization engine to offer the out-of-office settings 110.

The out-of-office settings may further be linked to the both the fraud guardian 310 and the account feature modification module for setting the payment cycle. Thus, if a an account holder makes uncharacteristic purchases during an out-of-office period, the fraud guardian may recognize these purchases as legitimate. Additionally, if an account holder's regularly scheduled payment cycle conflicts with an out-of-office period, the user experience customization engine may alter the payment cycle temporarily.

Thus, the out of office settings 110 provide a tool for cardholders to temporarily turn off their financial interactions when the customer is unable to connect or manage transactions. Out of office preferences 110 may also impact treatment policies (relaxed fraud thresholds at a planned destination) and present ways to deal in advance or delay transactions during the cardholders desired timeframe.

For the benefit of the financial institution, the out of office settings 110 provide a way to modify and affect treatment policies and allow for payments and recurring purchases not to be missed. The out of office settings can reduce mistakes and allow for better handling of missed payments. The system also informs the financial institution when customers are unavailable or traveling.

FIG. 12 is a user interface 120 including preference sliders determined by the preference selection module 350 of the user experience customization engine 300. The preference sliders 120 may be offered in multiple categories and may apply to interactions through various modes including telephone, mail, and electronic as exemplified by online selection 121. The illustrated preference sliders 120 may be provided to dictate account holder preferences in various categories such as management 122, education 123, spending 124, and information 125.

Referring to FIG. 3, movement of the preference sliders may communicate to the user experience customization engine 300 that the user would like to change the presentation mode and the preference selection module 350 may execute these changes. For account holder convenience, links to permissions, 127, payment 128, and out of office settings 129 may be offered on the interface 120.

In embodiments of the invention, the preference sliders interface 120 may be set up upon account initiation to determine a user's landing page. Dimensions range from content to level of detail to presentation style. The preference sliders 120 enable users to change the look and feel of the interface. Thus, account holders feel invested in the experience with minimal effort and get the information they want in the manner they want it.

The preference sliders 120 also enable the financial institution to gain an understanding of what users want. Preference sliders may provided across various dimensions such as management, education, spending, information, presentation, and permissions.

Figure 13:
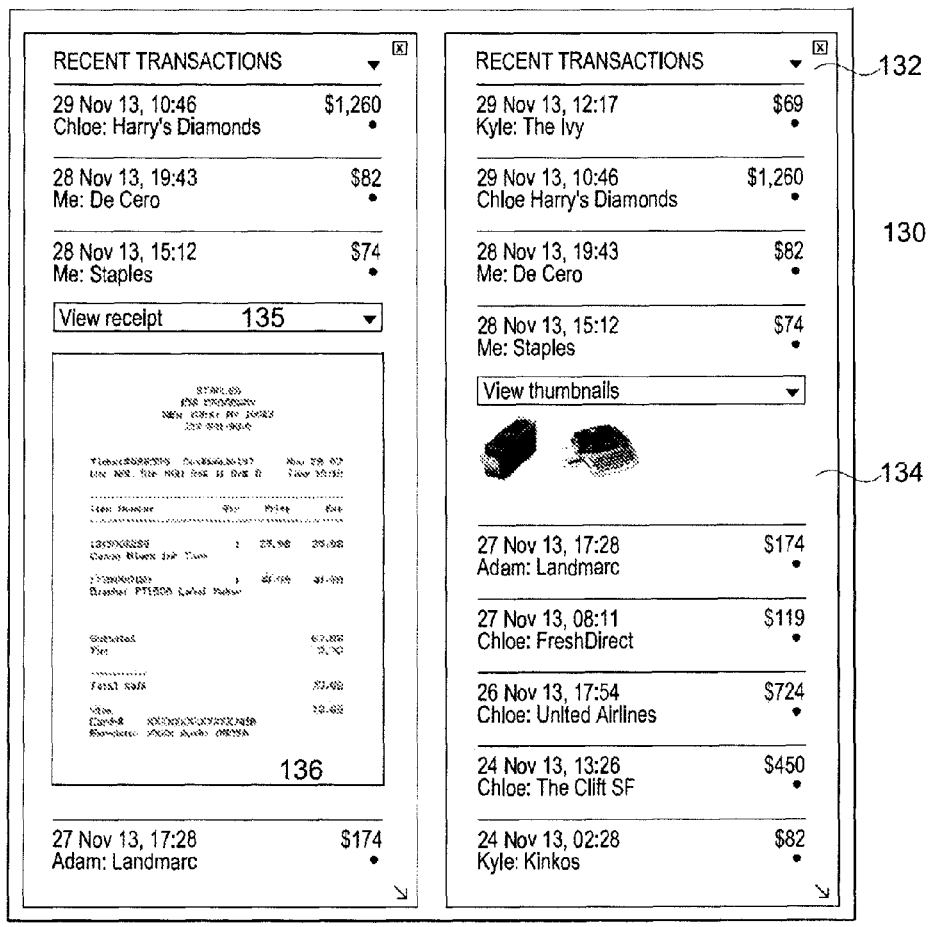
FIG. 13 illustrates a receipt collector user interface in accordance with an embodiment of the invention.

FIG. 13 illustrates a receipt collector user interface 130 in accordance with an embodiment of the invention. The receipt collector user interlace 130 may be formulated by receipt management module 370 of the user experience customization engine 300. A receipt collection function of the user behavior monitoring components may collect receipts and list multiple receipts under a recent transactions section 132. Additionally, a view thumbnails option 134 may be provided for graphic presentation. By selecting a view receipt option 135, an account holder can view a snapshot 136 of a merchant receipt.

Thus, the receipt management module 370 provides an interactive archive of all purchase and payment receipts. The receipt management module 370 captures merchant pass-through data for receipts, which can later be displayed on the interlace 130, collated, grouped, sorted, searched, and printed. Additionally, a "shopping off the statement" feature may allow account holders to reorder previously purchased items with a single click.

The receipt management module 370 centralizes all receipts in one place without the hassle of managing and storing paper. The receipt management module 370 reminds users of how balances were built up and eliminates any confusion over charges. The receipt management module 370 further simplifies expense tracking and reporting for businesses and enables the financial institution to offer partner details and provide a one stop shop.

Additionally, the receipt management module 370 may operate substantially as describe in co-pending U.S. patent application Ser. No. 11/952,457 filed on Dec. 7, 2007

Figure 14:
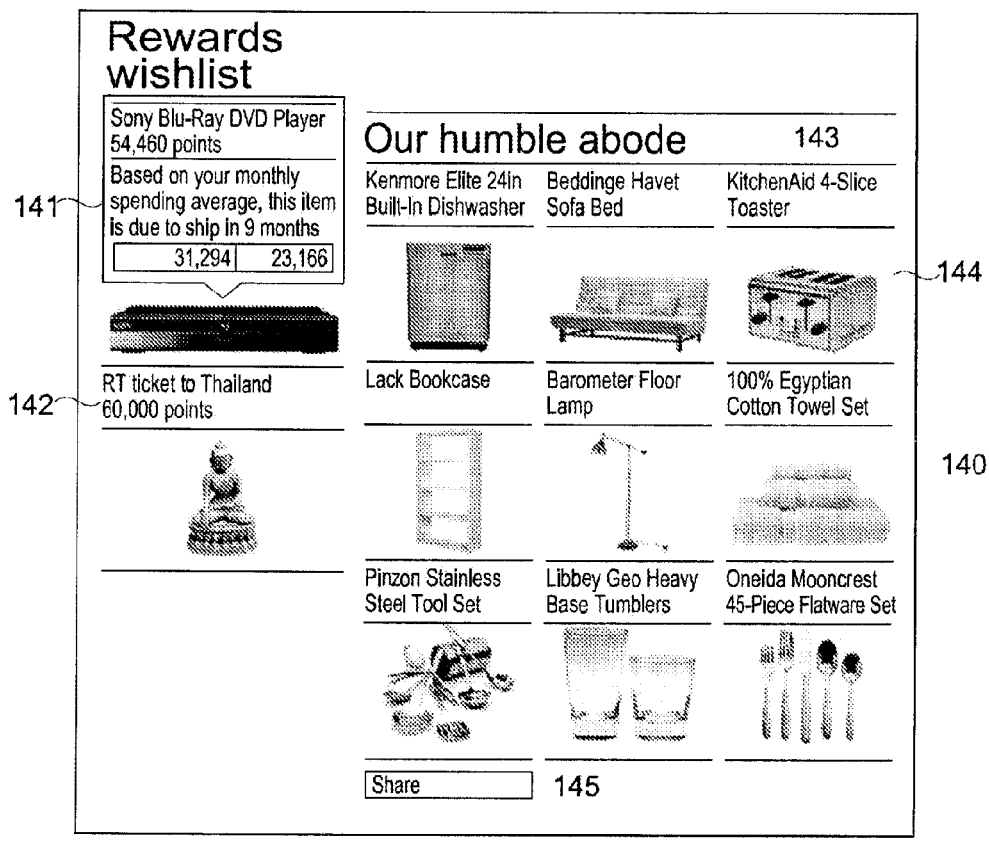
FIG. 14 illustrates a rewards wish list user interface in accordance with an embodiment of the invention.

FIG. 14 illustrates a rewards wish list user interface 140 in accordance with an embodiment of the invention. The rewards wish list may be generated by the rewards monitoring module 360 of the user experience customization engine 300.

The rewards wish list interface 140 is similar to the goal interface described above with respect to FIG. 9. The rewards wish list interface 140 may include multiple categories such as a home category 143 with multiple selectable items 144 available through the rewards program offered by the financial institution. Wish list items 141 and 142 may be listed along with the number of points required and the number of rewards points accumulated. Thus, the rewards wish list provides account holders with the ability to declare goals and gauge progress against goal.

Thus, the rewards wish list 140 is a list of target rewards goals that visualizes and earmarks desired rewards that account holders have placed in a queue. Upon point accrual, items and experiences are automatically secured and shipped. The rewards wish list 140 makes the intangible reward currency tangible and centralizes reward interaction on a single site. For the financial institution, the rewards wish list 140 differentiates the experience and provides the ability to offer new rewards experiences at the point and place when customers are considering them.

Figure 15:
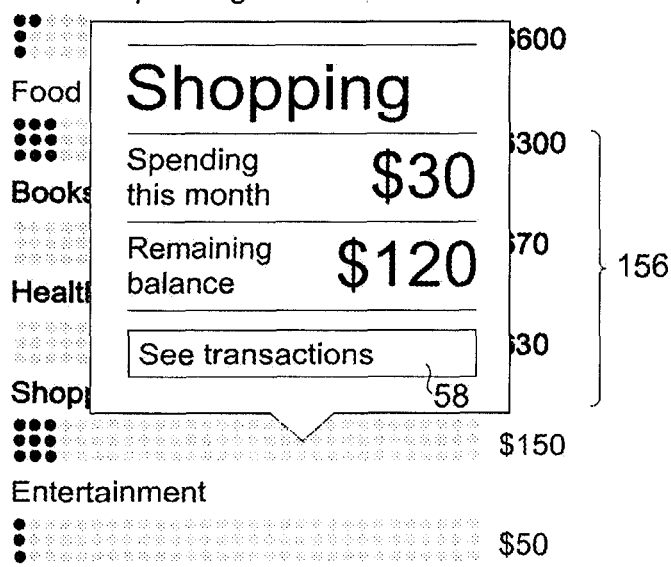
FIG. 15 illustrates a user interface for displaying spending thresholds in accordance with an embodiment of the invention.

FIG. 15 illustrates a spending threshold user interface 150 for displaying spending thresholds in accordance with an embodiment of the invention. The user interface 150 may be formulated by the threshold determination module 340 of the user experience customization engine 300 of FIG. 3.

In the displayed embodiment, monthly thresholds 152 are broken down into overall spending 154 and multiple spending categories 156. Pop-up messages 158 may be provided for each category. The pop up messages may display how much an account holder has spent and how much remains in the monthly budget as determined by the thresholds the account holder has set. In embodiments of the invention, the account holder may set the monthly thresholds using the provided threshold interface. In the illustrated embodiment, the threshold interface is provided on a mobile device and thus may easily be implement by an account holder who is in the process of purchasing items from a retail location against the pre-set thresholds.

Thus, the threshold interface 150 provides a challenge and response fraud protection system that the user specifies and controls. In additional embodiments of the invention, a limit on spending within a category may be assigned automatically by the financial institution based on purchase history. The account holder may manage the thresholds by changing and reviewing them in real time and adding categories and editing items. The threshold determination module 340 may also trigger alerts that may be conveyed through the threshold interface 150. The threshold interface 150 provides a quick and easy way to budget and enable passive engagement without sacrificing control or confidence.

Figure 16:
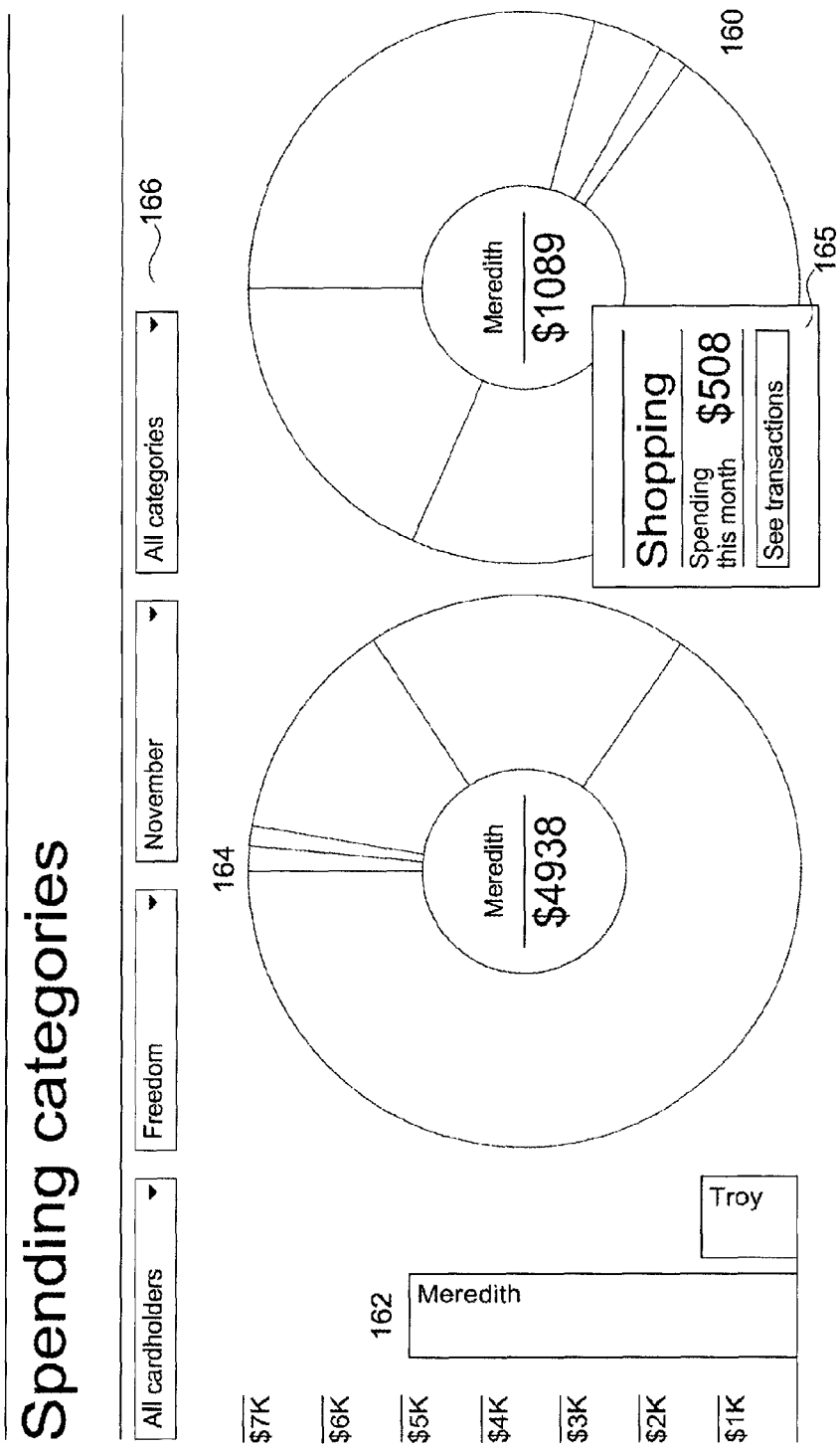
FIG. 16 is a user interface illustrating spending categories in accordance with an embodiment of the invention.

FIG. 16 is a spending category user interface 160 illustrating spending categories in accordance with an embodiment of the invention. The spending category user interface 160 may be formulated by the spending categorization components 322 of the user experience customization engine 300 illustrated in FIG. 3.

In the illustrated embodiment, spending by multiple parties is depicted in selectable categories. Two different representations 162 and 164 are provided along with a popup message 165 for each category. Spending categories provide a quick analog technique for checking status. The spending categories aggregate individual transactions into categories initially established via merchant data. Thus, the spending categorization components may interact with the receipt management module 370 described above. Data can be visualized according to user preferences and categories are connected to user's thresholds. The spending categories feature offers both an overall and detailed view to the user to increase self awareness around spending. The spending categories also enable the user to predict future behavior. The financial institution is able to learn what custom categories are meaningful to people.

Figure 17:
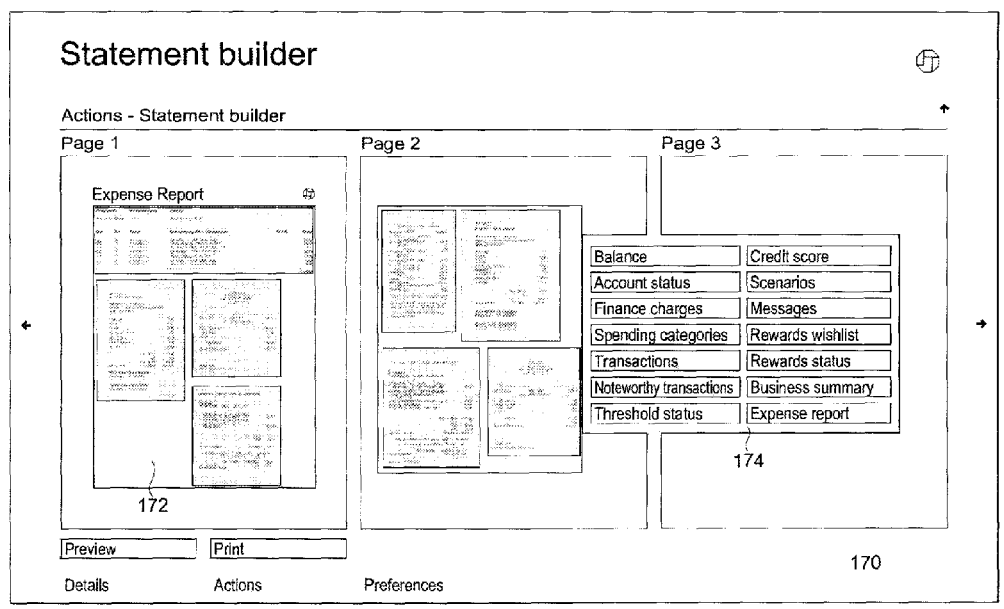
FIG. 17 illustrates a statement building user interface in accordance with an embodiment of the invention.

FIG. 17 illustrates a statement building user interface 170 in accordance with an embodiment of the invention. The statement builder user interface 170 provides a tool for applying the ability of the receipt collector to create a customized print statement 172. The statement building user interface may be formulated by the statement building tools 330 of the user experience customization engine 300 of FIG. 3.

Selectable options 174 may allow alteration of the print statement 172. In embodiments of the invention, the statement building interface 170 may include further include drag and drop interlace to create and customize print statements. Account holders can choose to edit and print these statements and snapshots at the time of their choosing. The statement builder interface 170 allows account holders to see their information in meaningful ways and allows them to create multiple statements for multiple purposes, such as expense, taxes, archiving, and analysis. Additionally, by monitoring customer behaviors, the financial institution can determine the concerns of account holders from their statement builder interface manipulations.

Figure 18:
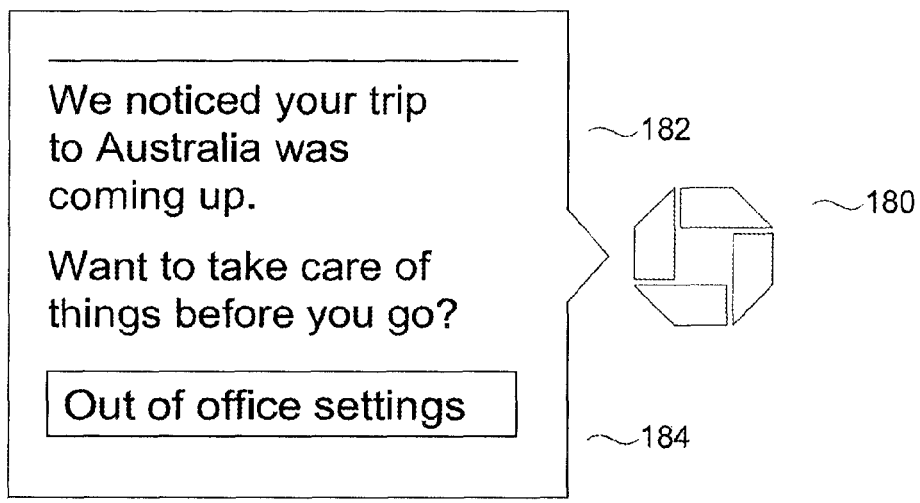
FIG. 18 illustrates a status indicator user interface in accordance with an embodiment of the invention.

FIG. 18 illustrates a status indicator user interface 180 in accordance with an embodiment of the invention. The status indicator user interface 180 may provide a message 182 and a link 184. The status indicator user interface 180 may appear on an account holder's desktop to inform the account holder of events in a timely manner. In embodiments of the invention, the status indicator user interface 180 remains active constantly and consumes a small portion of screen real estate to provide an ambient alert to personally meaningful changes to a user account.

The status indicator user interface 180 benefits cardholders motivated by fraud or engaged on a daily basis and provides a "no-step" access into the account. For the financial institution, the status indicator user interface reinforces that fact that the financial institution is always available for its customers and provides a new channel for accessing account holders when irregular activity and events occur. In additional embodiments, the status indicator user interface could be implemented to provide a platform for streaming offers from the financial institution.

Thus, embodiments of the invention relate to a method and system for providing an interface including modular customizable elements for implementation by a system user. The method and system have particular application for financial accounts, such as credit card accounts. The interface may adapt in response to user behaviors. However, the user may also customize features of the interface.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented customizable account interface and fraud detection system comprising:
    at least one computer memory storing an account holder account history, the account history including transaction data, the transaction data including transaction amount, merchant, transaction category, transaction location, and transaction date;
    a behavioral monitoring system monitoring account holder behaviors and storing transaction data in the computer memory;

a fraud prevention system for detecting suspected fraudulent behavior and interacting with the behavioral monitoring system, the behavioral monitoring system operable to,
  detect a predetermined account activity;
  generate, resultant to the detected predetermined account activity, a pop-up window providing a link to an out-of-office interface over a network to an account holder device enabling the account holder to enter out-of office settings; and
  deliver entered out-of-office settings to the fraud prevention system to enable automatic adjustment of fraud monitoring policies;
an account holder input interface allowing the account holder to select a display mode, wherein selectable display modes include at least a transaction by category display mode, a transaction by amount display mode, and a transaction by date display mode, each of the display modes displaying an account holder interface conveying the transaction data; and
at least one computer processor accessing the computer memory and executing instructions to perform steps including:
  receiving, over the network, account holder input for selection of a display mode to the account holder input interface;
  processing the account holder input and applying the account holder input to the stored transaction data;
  generating a display for an output interface based on the application of the account holder input to the stored transaction data to display at least one of a transaction by category display mode, a transaction by amount display mode, and a transaction by date display mode, and
  providing account holders with selectable disallowed spending behaviors through the account holder input interface;
wherein the fraud detection system is capable of identifying an attempt to engage in a selected disallowed spending behavior and to further notify the account holder that the disallowed spending behavior is a potentially fraudulent transaction via the output interface.

2. The system of claim 1, wherein the selectable disallowed spending behaviors include at least one of transaction amounts outside of a pre-specified range, pre-selected spending categories, pre-selected merchants, and pre-selected locations.

3. The system of claim 2, further processing rules input by the account holder for disallowed spending behaviors.

4. The system of claim 1, wherein the account holder input interface offers a goals interface including selectable financial goals.

5. The system of claim 4, the computer processor comparing the stored transaction data with at least one selected financial goal to inform the account holder upon achievement of the selected goal.

6. The system of claim 5, wherein the financial goals are sortable in order of priority.

7. The system of claim 1, wherein the account holder input interface provides a threshold determination interface for providing account holders with selectable spending thresholds in multiple categories.

8. The system of claim 1, wherein the computer processor further processes receipts from merchants and sorts the receipts into categories.

9. The system of claim 1, wherein the account holder input interface displays an out-of-office interface activated upon detection of behavior indicating travel.

10. The system of claim 1, wherein the account holder input interface is displayed on a mobile device.

11. A computer-implemented method for customizing an account interface and detecting fraudulent activity, the method comprising:
  receiving, from a behavioral monitoring system, transaction data indicative of account holder purchasing behaviors, and including at least transaction amount, merchant, transaction category, transaction location, and transaction date;
  storing, in at least one computer memory the captured transaction data to develop an account holder account history;
  implementing the behavioral monitoring system to:
    detect an indication of a predetermined account activity;
    generate, resultant to the detected predetermined account activity, a pop-up window providing a link to an out-of-office interface over a network to an account holder device enabling the account holder to enter out-of office settings; and
    deliver entered out-of-office settings to a fraud prevention system to enable automatic adjustment of fraud monitoring policies;
  implementing the fraud prevention system operable to:
    provide account holders with selectable disallowed spending behaviors through the user input interface;
    detect an attempt to complete a selected disallowed spending behavior; and
    identify the attempt to complete the selected disallowed spending behavior as a potentially fraudulent behavior;
  receiving, from an account holder input interface, a display mode selection, wherein selectable display modes include at least a transaction by category display mode, a transaction by amount display mode, and a transaction by date display mode, each of the display modes displaying a user interface conveying the transaction data; and
  implementing a computer processor to execute instructions and access the stored transaction data and account holder input to perform steps including;
    processing the account holder input and applying the account holder input to the stored transaction data; and
    generating a display for an output interface based on the application of the account holder input to the stored transaction data to display at least one of a transaction by category display mode, a transaction by amount display mode, and a transaction by date display mode; and
    wherein the output interface is also operable to display a notification to the account holder regarding the potentially fraudulent behavior.

12. The method of claim 11, wherein the selectable disallowed spending behaviors include at least one of transaction amounts outside of a pre-specified range, pre-selected spending categories, pre-selected merchants, and pre-selected locations.

13. The method of claim 12, further comprising processing rules input by the account holder for disallowed spending behaviors.

14. The method of claim 11, wherein the account holder input interface offers a goals interface including selectable financial goals.

15. The method of claim 14, further comprising comparing the stored transaction data with at least one selected financial goal to inform the account holder upon achievement of the selected goal.

16. The method of claim 15, wherein the financial goals are sortable in order of priority.

17. The method of claim 11, wherein the account holder input interface provides a threshold determination interface for providing account holders with selectable spending thresholds in multiple categories.

18. The method of claim 11, further comprising processing receipts from merchants and sorting the receipts into categories.

19. The method of claim 11, wherein the account holder input interface displays an out-of-office interface activated upon detection of behavior indicating travel.

20. The method of claim 11, further comprising displaying the account holder input interface on a mobile device.

* * * * *